(12) United States Patent
O'Rear et al.

(10) Patent No.: US 10,179,879 B2
(45) Date of Patent: Jan. 15, 2019

(54) METHOD FOR REMOVING MERCURY FROM CRUDE OIL

(71) Applicant: Chevron U.S.A. Inc., San Ramon, CA (US)

(72) Inventors: Dennis John O'Rear, Petaluma, CA (US); Russell Evan Cooper, Martinez, CA (US); Shabbir Husain, Emeryville, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 180 days.

(21) Appl. No.: 15/016,407

(22) Filed: Feb. 5, 2016

(65) Prior Publication Data

US 2016/0251582 A1  Sep. 1, 2016

Related U.S. Application Data (60) Provisional application No. 62/120,962, filed on Feb. 26, 2015.

(51) Int. Cl.
| | | |
|---|---|---|
| C10G 21/00 | (2006.01) |
| C10G 21/08 | (2006.01) |
| C04B 18/04 | (2006.01) |
| C10G 21/28 | (2006.01) |
| E21B 43/40 | (2006.01) |

(52) U.S. Cl.
CPC .......... *C10G 21/08* (2013.01); *C04B 18/0472* (2013.01); *C10G 21/28* (2013.01); *E21B 43/40* (2013.01); *C10G 2300/205* (2013.01)

(58) Field of Classification Search
CPC ........ C10G 21/00; C10G 21/08; C10G 21/28; C04B 18/0472; E21B 43/40
See application file for complete search history.

(56) References Cited

U.S. PATENT DOCUMENTS

| | | | |
|---|---|---|---|
| 4,474,896 A | 10/1984 | Chao | |
| 4,915,818 A | 4/1990 | Yan | |
| 6,268,543 B1 | 7/2001 | Sakai et al. | |
| 6,350,372 B1 | 2/2002 | Degnan et al. | |
| 2007/0048212 A1* | 3/2007 | Bierle | C01C 1/20 |
| | | | 423/511 |
| 2013/0306311 A1* | 11/2013 | Cooper | C10G 21/08 |
| | | | 166/267 |

OTHER PUBLICATIONS

Jones, Handbook of Petroleum Processing, Chapter 3 The Atmospheric and Vacuum Crude Distillation Units, Springer 2008.*
Wilhelm et al. Energy & Fuels 2006, 20, 180-186 (See Table 5 on p. 184) http://pubs.acs.org/doi/pdf/10.1021/ef0501391.
Tao et al. J. Anal. At. Spectrom., 1998, 13, 1085-1093 http://pubs.rsc.org/en/content/articlepdf/1998/ja/a803369b.

* cited by examiner

*Primary Examiner* — Prem C Singh
*Assistant Examiner* — Brandi M Doyle
(74) *Attorney, Agent, or Firm* — Karen R. DiDomenicis; Howard V. Owens (57) ABSTRACT

A method is provided for recovering mercury from a crude oil into an alkaline ammonium sulfide contacting solution. Soluble mercury complexes in the contacting solution are converted to particulate mercury. The particulate mercury can be recovered by filtering, and the ammonium sulfide in the contacting solution recycled to the aqueous contacting solution.

26 Claims, 2 Drawing Sheets

METHOD FOR REMOVING MERCURY FROM CRUDE OIL

FIELD

The invention relates generally to a process, method, and system for removing mercury from hydrocarbon fluids such as crude oil.

BACKGROUND

Mercury can be present in trace amounts in all types of hydrocarbon streams such as crude oils. The amount can range from below the analytical detection limit to several thousand ppbw (parts per billion by weight) depending on the source.

Methods have been disclosed to remove mercury from liquid hydrocarbon feed, specifically volatile mercury. It has been reported that mercury in crude oil is primarily in the form of volatile species, e.g., 90% Hg(0) and only 10% DMHg. See Wilhelm et al. Energy & Fuels 2006, 20, 180-186 (See Table 5 on page 184) (http://pubs.acs.org/doi/pdf/10.1021/ef0501391). In contrast, Tao et al. J. Anal. At. Spectrom., 1998, 13, 1085-1093 (http://pubs.rsc.org/en/content/articlepdf/1998/ja/a803369b) show in Table 8 that dialkylmercury species out-proportion elemental Hg in condensates and natural gas liquids.

U.S. Pat. No. 4,915,818 discloses a method of removing mercury from liquid hydrocarbons (natural gas condensate) by contact with a dilute aqueous solution of alkali metal sulfide salt, for reaction of the sulfur component with the mercury, where the mercury sulfur compounds precipitate and settle for subsequent recovery as a solid waste. U.S. Pat. No. 6,268,543 discloses a method for removing elemental mercury with a sulfur compound where mercury is removed as a solid. U.S. Pat. No. 6,350,372 discloses the removal of mercury from a hydrocarbon feed upon contact with an oil soluble or oil miscible sulfur compound U.S. Pat. No. 4,474,896 discloses using polysulfide based absorbents to remove elemental mercury from gaseous and liquid hydrocarbon streams.

There are also a number of commercially available processes and products for the removal of (volatile) elemental mercury from hydrocarbon streams including but not limited to ICI Synetix's Merespec™ fixed bed absorbents, UOP's HgSIV™ regenerative mercury removal adsorbents, and Johnson Matthey's Puraspec™ and Puracare™ granulated absorbents for the removal of mercury from naphtha and/or gaseous hydrocarbon streams. Adsorption technology does not work well for crude oils and condensates with low levels of mercury, and with primarily non-volatile mercury.

While aqueous sulfide treatments for crude oil result in removal of mercury from the crude oil, conventional processes are burdened by aqueous fluids containing spend sulfide solutions that must be discarded. There is further need for methods for removing mercury from crude oil using reagents that may be recycled and reused in the method.

SUMMARY

A method is provided for removing mercury from crude oil using an aqueous contacting solution containing dissolved ammonium sulfide. Mercury in the crude oil is extracted into the aqueous contacting solution, forming a mercury containing sulfide solution. The mercury containing sulfide solution is then treated to remove the dissolved ammonium sulfide as $NH_3$ and $H_2S$, at least a portion of which are recycled to the aqueous contacting solution. Treating the mercury containing sulfide solution may further include generating vapor phase water, which may be combined with the $NH_3$ and the $H_2S$ for recycle to the aqueous contacting solution. A mercury containing sulfide solution that is produced in the method may be further treated to produce a filtered water stream and a concentrated particulate HgS containing water stream. At least a portion of the filtered water stream may be recycled to the aqueous contacting solution.

Accordingly, a method is provided for removing a trace amount of mercury in a crude oil feed, the method including the steps of providing a crude oil having a concentration of mercury in which at least 50% of the mercury is non-volatile mercury; mixing the crude oil with an aqueous contacting solution at a crude oil/contacting solution volumetric ratio in a range from 0.1:1 to 20:1, forming a mixture, wherein the aqueous contacting solution contains recycle $NH_3$ and recycle $H_2S$; extracting at least a portion of the non-volatile mercury from the crude oil into the aqueous contacting solution as soluble mercury sulfur complexes forming a mercury containing sulfide solution; separating the mercury containing sulfide solution from the crude oil for a treated crude oil having a reduced concentration of non-volatile mercury; stripping the mercury containing sulfide solution for a time sufficient to reduce the pH of the solution to less than 7.5, and recovering $NH_3$, $H_2S$, and a particulate HgS containing water stream; and recycling at least a portion of the $NH_3$ as the recycle $NH_3$ to the aqueous contacting solution and recycling at least a portion of the $H_2S$ as the recycle $H_2S$ to the aqueous contacting solution for mixing with the crude oil.

In one embodiment, the aqueous contacting solution comprises recycle $NH_3$, recycle $H_2S$, and ammonium hydroxide.

Practicing the method may also include filtering the particulate HgS containing water stream to remove at least 50 wt. % of the mercury contained therein, to form a filtered water stream, at least a portion of which may be recycled to the aqueous contacting solution for mixing with the crude oil.

Practicing the method may also include filtering the particulate HgS containing water stream and recovering a concentrated particulate HgS stream that contains at least 70 wt. % of the particulate mercury contained in the particulate HgS containing water stream.

Practicing the method may also include recovering a vapor phase water stream, the $NH_3$ and the H2S from the step of stripping the mercury containing sulfide solution; and condensing the vapor phase water stream in the presence of the $NH_3$ and the $H_2S$ to form a combined stream comprising the recycle $NH_3$ and the recycle $H_2S$ for recycling to the aqueous contacting solution.

Practicing the method may also include stripping the treated crude oil; generating a second $NH_3$ and recycling at least a portion of the second $NH_3$ to the aqueous contacting solution for mixing with the crude oil; and generating a second $H_2S$ and recycling at least a portion of the second $H_2S$ to the aqueous contacting solution for mixing with the crude oil.

DETAILED DESCRIPTION

The following terms will be used throughout the specification and will have the following meanings unless otherwise indicated.

"Hydrocarbons" refers to hydrocarbon streams such as crude oils and/or natural gases.

"Produced fluids" refers to hydrocarbon gases and/or crude oil. Produced fluids may be used interchangeably with hydrocarbons.

"Crude oil" refers to a fluid that is treated to remove mercury therefrom. The crude oil may be a petroleum fluid that has been produced from a geological formation. The crude oil may have been degassed prior to the mercury removal treatment. The crude oil may be a condensate stream derived from distillation of a produced fluid (whether degassed or not prior to distillation). The crude oil is typically in liquid form. Under some formation conditions of temperature and/or pressure, the crude oil may be in a solid phase. As used herein, a "slop oil" is another example of a crude oil. Slop oil is an oily mixture that is obtained from the surface of a waste water stream in a refinery or an oil production operation. Sources of slop oils include API separators, IGF and IAF froth floatation units. In one embodiment, slop oils are oil-containing mixtures that also contain water in an amount between 0.5 and 90% and solids in an amount between 0.5 and 90%. Under some conditions, the crude oil may be in a very viscous liquid phase that flows slowly, if at all. Crude, crude oil, crudes and crude blends are used interchangeably and each is intended to include both a single crude oil and blends of crude oils.

"Production well" is a well through which produced fluids are carried from an oil-bearing geological formation to the earth's surface, whether the surface is water or land. Surface facilities are provided for handling and processing the crude oil from the formation as it arrives on the surface.

"Topside production facility" refers to the surface hardware on an offshore oil platform or connected group of platforms, such as the oil production plant and the drilling rig.

"Injection well" is a well through which at least a treatment agent is passed from the surface facilities into the geological formation. In one embodiment, a well is alternatively employed in a producing and an injection mode. The well is alternatively employed for injecting a material into the formation for some period of time. The process conditions within the well are then adjusted to permit crude oil to flow into the well, from where it is withdrawn to surface facilities.

"Hydrocarbon material" refers to a pure compound or mixtures of compounds containing hydrogen and carbon and optionally sulfur, nitrogen, oxygen, and other elements. Examples include crude oils, synthetic crude oils, petroleum products such as gasoline, jet fuel, diesel fuel, lubricant base oil, solvents, and alcohols such as methanol and ethanol.

"Heavy metals" refers to mercury, arsenic, antimony and tin. In one embodiment, "heavy metals" refers to mercury.

"Trace amount" refers to the amount of heavy metals in the crude oil. The amount varies depending on the crude oil source and the type of heavy metal, for example, ranging from a few ppb to up to 100,000 ppb for mercury and arsenic.

"High mercury crude" refers to a crude oil with 50 ppbw or more of mercury, e.g., 100 ppbw or more of mercury; or 250 ppbw or more of mercury.

"Mercury sulfide" may be used interchangeably with HgS, referring to mercurous sulfide, mercuric sulfide, or mixtures thereof. Normally, mercury sulfide is present as mercuric sulfide with a stoichiometric equivalent of approximately one mole of sulfide ion per mole of mercury ion.

"Percent volatile mercury" in one embodiment is measured by stripping 15 ml of crude oil or condensate with 300 ml/min of nitrogen ($N_2$) for one hour. For samples which are fluid at room temperature, the stripping is carried out at room temperature. For samples which have a pour point above room temperature, but below 60° C., the stripping is done at 60° C. For samples which have a pour point above 60° C., the stripping is at 10° C. above the pour point.

"Percent particulate mercury" refers to the portion of mercury that can be removed from the crude oil by centrifugation or filtration. After the centrifuging the sample, the mercury concentration is determined for the middle of the hydrocarbon layer. The sample is not taken from sediment, water or rag layers. The sample is not shaken or stirred after centrifugation. In one embodiment, percent particulate mercury is measured by filtration using a 0.45 micron filter or by using a modified sediment and water (BS&W) technique described in ASTM D4007-11. The sample is heated in accordance with the procedure. If the two methods are in disagreement, the modified basic BS&W test is used. The modifications to the BS&W test includes: omission of dilution with toluene; demulsifier is not added; and the sample is centrifuged two times with the water and sediments values measured after each time. If the amount of sample is small, the ASTM D4007-11 procedure can be used with smaller centrifuge tubes, but if there is disagreement, the modified basic BS&W test is used with the centrifuge tubes specified in ASTM D4007-11.

"Hg-particulate crude oil" refers to a crude oil that contains 25% or more of its mercury content as particulate mercury.

"Predominantly non-volatile (mercury)" in the context of crude oils refers to crude oils for which less than 50% of the mercury can be removed by stripping, e.g., less than 25% or less than 15% of the mercury can be removed by stripping.

"Predominantly Hg-particulate crude oil" refers to a crude oil for which 50% or more of the mercury is particulate (non-volatile) mercury, e.g., for which 65% or more of the mercury is particulate mercury; for which 75% or more of the mercury is particulate mercury; or for which 90% or more of the mercury is particulate mercury.

"Hg" refers to the total mercury of mercury which may be present, in all forms, including one or more of elemental mercury, mercury compounds or mercury complexes, unless otherwise specified. "Hg(0)" refers to elemental mercury.

Unless otherwise specified, "ammonium sulfide" encompasses a composition having a molecular formula $NH_4HS$ (e.g. ammonium bisulfide) with a $NH_4/S$ molar ratio of 1:1, and a composition having a molecular formula $(NH_4)_2S$ (e.g. ammonium sulfide) with a $NH_4/S$ molar ratio of 2:1, or a mixture of the two. Thus, "ammonium sulfide" encompasses a $NH_4/S$ molar ratio in a range of equal to or greater than 1:1, or in one embodiment in a range from 1:1 to 2:1, inclusive of end members. Likewise, the contacting solution includes ammonium sulfide having a $NH_4/S$ molar ratio in a range of greater than 1:1, or in one embodiment in a range from 1:1 to 2:1, inclusive of end members. In embodiments, the contacting solution has an $NH_4/S$ molar ratio of greater than 2; in one embodiment at least 3; in one embodiment at least 6; and in one embodiment at least 10.

"Halogens" refers to diatomic elements or compounds containing atoms from the column of the periodic table headed by fluorine, for example $F_2$, $Cl_2$, $Br_2$, $I_2$, and compounds thereof.

"Halogen oxides" refers to molecules which combine one or more halogen atoms and oxygen, for example $NaClO$, $ClO_2$, $NaClO_4$.

"Flow-back water" refers to water that flows back to the surface after being placed into a geological formation as part of an enhanced oil recovery operation, e.g., a hydraulic fracturing operation.

"Produced water" refers to the water generated in the production of oil and gas, including formation water (water present naturally in a reservoir), as well as water previously injected into a formation either by matrix or fracture injection, which can be any of connate water, aquifer water, seawater, desalinated water, flow-back water, industrial by-product water, and combinations thereof.

The invention relates to systems and processes for the removal of mercury from a crude oil. The system in one embodiment is located at a production facility, wherein produced water is used in the mercury removal process prior to transport. A concentrated HgS material generated during the removal process can be injected into an underground facility, e.g., a reservoir. In one embodiment, the system is located at a refining facility. A typical refining facility has facilities for recovering and treating gaseous ammonia and gaseous hydrogen sulfide, suitable sources of water for forming a contacting solution for the method; and suitable water treatment steps for removing mercury from aqueous streams produced in the method.

Crude Oil Feedstock: Mercury can be present in crude oil feed as elemental mercury Hg(0), ionic mercury, inorganic mercury compounds, and/or organic mercury compounds. Examples include but are not limited to: mercuric halides (e.g., $HgXY$, X and Y could be halides, oxygen, or halogen-oxides), mercurous halides (e.g., $Hg_2XY$, X and Y could be halides, oxygen, or halogen-oxides), mercuric oxides (e.g., HgO), mercuric sulfide (e.g., HgS, meta-cinnabar and/or cinnabar), mercuric sulfate ($HgSO_4$), mercurous sulfate ($Hg_2SO_4$), mercury selenide (e.g., $HgSe_2$, $HgSe_8$, HgSe), mercury hydroxides, and organo-mercury compounds (e.g., alkyl mercury compounds) and mixtures of thereof The invention relates to the removal of trace mercury in crude oil that contains predominantly particulate or non-volatile mercury, referring to crude oils containing mercury of which less than 50% of the mercury can be removed by stripping (or more than 50% of the mercury is particulate) in one embodiment; less than 35% of the mercury in the crude oil can be removed by stripping in a second embodiment; and less than 25% of the mercury in the crude oil can be removed by stripping in a third embodiment. In the crude oil, the non-volatile mercury can be present as particles, and/or adsorbed onto particulate surfaces such as clay minerals, inorganic mineral scale, sand, and asphaltenes and as suspended mercury sulfide.

The crude oil containing small amounts of heavy metals such as mercury has a specific gravity of at least 0.75 at a temperature of 60° F. in one embodiment; at least 0.85 in a second embodiment; and at least 0.90 in a third embodiment. In one embodiment, the crude oil is in the form of a mixture of crude oil and water produced from a hydrocarbon reservoir or from a production well. For some sources, the crude oil to be treated may contain little if any produced water. For some other sources, the amount of produced water can be as much as 98% of the crude oil to be treated. Crude oil feed to be treated refers to both crude oil by itself as well as crude oil-water mixtures.

The non-volatile mercury in the crude oil is removed by treatment with a contacting solution containing at least a water-soluble sulfur species, e.g., sulfides and hydrosulfides. The non-volatile mercury is extracted into the aqueous phase as soluble mercury complexes. Little or no solid mercury complex, e.g., HgS, is formed in the aqueous phase during extraction. Little or no solid mercury complex means than less than 25% of the mercury in the aqueous phase after extraction is in the form of a solid such as HgS in one embodiment; less than 5% HgS is formed in a second embodiment; and less than 1% HgS in a third embodiment. The percent of solid mercury complexes can be determined by filtration, e.g., through a 0.45 micron (or less) filter. The amount of HgS formed in the aqueous phase may be maintained at a level of less than 25% by, for example, maintaining the temperature of the aqueous phase at the same temperature during and after the extraction. HgS formation in the aqueous phase may also be minimized by preventing the stripping of components of the aqueous phase, by preventing oxidation of the aqueous phase or by minimizing any pH change in the aqueous phase.

In one embodiment, the treatment is in-situ in the formation, wherein the contacting solution is injected into the formation in the process of water injection or water flooding. Water injection or waterflooding is a widely applied method of improved oil recovery, wherein water is used as the dilution fluid for injecting into the geological formation through a system of injection boreholes to facilitate recovery of hydrocarbons from subsurface formations. In another embodiment, the treatment is in-situ via pipeline reaction, wherein the contacting solution is injected into the wellbore, and the reaction for the removal of mercury occurs in the pipeline or borehole of the production well as the crude oil is being extracted. The contacting solution used to remove the non-volatile mercury may include produced water from the geological formation.

In one embodiment prior to treatment with a contacting solution, the crude oil produced from an oil reservoir via a production well prior to treatment is first passed to a separation device for the separation of the crude oil from dissolved natural gas and at least a portion of the produced water. The separated natural gas can be directed to an absorber/scrubber for the removal of volatile mercury separately.

In one embodiment, the crude oil is treated with the contacting solution in a refinery location, prior to, during or after a desalting step. Desalting the crude oil includes contacting the crude oil with water or an aqueous solution to remove dissolved or suspended salts from the crude oil, followed by a step of dewatering the crude oil. Desalting crude oil is a common process step for preparing the crude oil for distillation and further refining.

In one embodiment, the crude oil is a condensate recovered during production of natural gas, the condensate being the fraction generated during natural gas production that condenses at ambient conditions (e.g. 1 atmosphere pressure and 20° C.). In one embodiment, the crude oil is a condensate fraction recovered from a crude oil distillation step during refinery processing of the crude oil.

An aqueous contacting solution used to remove the non-volatile mercury is formed by combining water or an aqueous solution with ammonia and hydrogen sulfide. The ammonia may be added as gaseous ammonia, in an aqueous ammonium hydroxide solution, or a combination. Likewise, the hydrogen sulfide may be added as gaseous hydrogen sulfide, in an aqueous hydrogen sulfide solution, or a combination. Ammonia and hydrogen sulfide may be added sequentially or simultaneously to the aqueous solution or as a combined gaseous stream, in any order. Ammonia and/or hydrogen sulfide may be added to an aqueous solution, after which a solution of ammonium hydroxide may be added to achieve the desired $NH_4/S$ ratio in the contacting solution. Alternatively, ammonia, hydrogen sulfide or a combination may be added to an ammonium hydroxide solution in an amount to achieve the desired $NH_4/S$ ratio. In one embodiment, a $NH_4/S$ molar ratio in the contacting solution is equal to or greater than 1:1; in another embodiment, in a range from 1:1 to 2:1, inclusive of end members. In another embodiment, the $NH_4/S$ molar ratio is greater than 2; in another embodiment, at least 3; in another embodiment, at least 6; in one embodiment; in another embodiment at least 10. Addition of ammonia or ammonium hydroxide to the contacting solution may be controlled using pH. For example, sufficient ammonia/ammonium hydroxide may be supplied to produce a contacting solution having a pH of greater than 9; in another embodiment greater than 10; in another embodiment, greater than 11; and in another embodiment greater than 11.5. In one embodiment, the contacting solution contains at least 0.1 wt. % ammonium sulfide; in another embodiment, at least 0.5 wt. % ammonium sulfide; in another embodiment, at least 1 wt. % ammonium sulfide; in another embodiment, at least 3 wt. % ammonium sulfide.

Additives such as demulsifiers, water clarifying chemicals, and oxygen scavengers may also be included in the aqueous contacting solution.

In one embodiment in addition to the complexing agent, at least one of an anti-foam and/or a demulsifier is added to the glycol solution. As used herein, the term anti-foam includes both anti-foam and defoamer materials, for preventing foam from happening and/or reducing the extent of foaming. Additionally, some anti-foam material may have both functions, e.g., reducing/mitigating foaming under certain conditions, and preventing foam from happening under other operating conditions. Anti-foam agents can be selected from a wide range of commercially available products such as silicones, e.g., polydimethyl siloxane (PDMS), polydiphenyl siloxane, fluorinated siloxane, etc., in an amount of 1 to 500 ppm.

In one embodiment, at least a demulsifier is added in a concentration from 1 to 5,000 ppm. In another embodiment, a demulsifier is added at a concentration from 10 to 500 ppm. In one embodiment, the demulsifier is a commercially available demulsifier selected from polyamines, polyamidoamines, polyimines, condensates of o-toluidine and formaldehyde, quaternary ammonium compounds and ionic surfactants. In another embodiment, the demulsifier is selected from the group of polyoxyethylene alkyl phenols, their sulphonates and sodium sulphonates thereof. In another embodiment, the demulsifier is a polynuclear, aromatic sulfonic acid additive.

In another embodiment, in addition to the complexing agent and optionally at least a demulsifier/anti-foam agent, an oxygen scavenger is preferably added to any of the glycol solution, the amine solution, and the absorbent. The oxygen scavenger may be present in an amount ranging from 0.001 to 1 wt. %, based on the weight of the glycol solution, lean amine, or absorbent. As dissolved oxygen in the amine or glycol storage tank would lead to corrosion of iron surfaces, or react with the feed gas making heat stable salts which are difficult to separate in the regeneration step, the oxygen scavenger removes traces of dissolved oxygen present, minimizing corrosion impact.

Examples of oxygen scavengers include bisulfites, metabisulfites, hydrazine salts, hydroxylamine salts, guanidine salts, N,N-Diethylhydroxylamine, oximes, dithionites, ascorbic acid, and isoascorbic acid. The anion salts of these oxygen scavengers can be chlorides, sulfates, and other suitable anions. The cations associated with the oxygen scavengers can be sodium, potassium or volatile cations as described for the complexing agents. Volatile cations are preferred when they are used in an amine unit.

A compatible oxygen scavenger is one that does not react with the mercury complexing agent and reduce its effectiveness for mercury capture. Examples of oxygen scavengers that react with a complexing agent such as polysulfide include bisulfites and metabisulfite. In one embodiment, the oxygen scavenger is selected for compatibility with the mercury complexing agent. Examples of compatible oxygen scavengers include: hydrazine salts, guanidine salts, N,N-Diethylhydroxylamine, oximes, dithionites, ascorbic acid, and isoascorbic acid.

Water clarifying chemicals that may be included in the aqueous contacting solution may be selected from coagulants, including aluminum and iron based coagulants. Specific examples of aluminum based coagulants include aluminum sulfate, aluminum chloride, aluminum chlorosulfate, aluminum chlorohydrate, and sodium aluminate. Specific examples of iron based coagulants include iron sulfate and iron chloride.

The contacting solution may be introduced continuously to the crude oil in a crude oil processing facility, or intermittently by mixing batch-wise with the crude oil in a crude oil production facility. Reaction water from which the contacting solution is made is non-potable water selected from any of connate water, aquifer water, seawater, desalinated water, oil field produced water, industrial by-product water, or combinations thereof. In one embodiment, the water stream consists essentially of produced water. In one embodiment, the water for use in the removal of mercury is from a water storage/treatment facility connected to the crude oil processing facility, wherein produced water, seawater, etc., is recovered and prepared with the addition of the sulfur compound needed for the removal of the heavy metals. In one embodiment, at least a portion of the reaction water is the filtered water stream which is recycled from the mercury removal process. The water containing the sulfur compound may be cold, heated, or at ambient temperature prior to being mixed with the crude oil.

The amount of contacting solution needed for mercury removal is determined by the effectiveness of the sulfur compounds contained therein. The amount of sulfur used is at least equal to the amount of mercury in the crude oil on a molar basis (1:1), if not in an excess amount. In one embodiment, the S:Hg molar ratio is greater than 50:1; in another embodiment, it is greater than 100:1; in another embodiment it is greater than 1000:1 The upper limit of the S:Hg ratio is typically determined by operational factors, but may be as high as 20,000:1 in one embodiment; as high as 10,000,000:1 in a second embodiment; or higher.

In one embodiment, the aqueous contacting solution is added to the crude oil at a volume ratio of crude oil to aqueous contacting solution ranging between 0.1:1 to 20:1 in one embodiment; between 0.5:1 and 5:1 in a second embodiment; from 1:1 to 2:1 in a third embodiment. The pH of the contacting solution prior to addition to the crude oil is adjusted to a pre-selected pH of at least 8 in one embodiment; at least 9 in a second embodiment; at least 10 in a third embodiment; and at least 11 in a fourth embodiment, by the addition of ammonium hydroxide. The pH can be further adjusted with the addition of amines such as monoethanol amine, ammonia, diethanol amine, or a strong base such as sodium hydroxide, potassium hydroxide, etc. The added base can be added to the crude oil concurrently with the contacting solution, or separately before or after the addition of the contacting solution to the crude oil, or intermittently in the mixing of the contacting solution and the crude oil.

Crude oil is contacted with the contacting solution at conditions to maintain ammonia and hydrogen sulfide in aqueous solution. In upstream, near wellbore operation, the contacting may be conducted at a pressure within a range from atmospheric to 10,000 psig, and at a temperature within a range from 20° to 150° C. An illustrative pressure is within a range from 1000 psig to 3000 psig. An illustrative temperature is within a range from 50° C. to 150° C. In downstream, refinery operation, the contacting may be conducted at a pressure within a range from atmospheric to 500 psig and at a temperature within a range from 20 to 200 C. An illustrative pressure is within a range from 100 psig to 300 psig. An illustrative temperature is within a range from 100° C. to 300° C.

The contacting solution is generally mixed with the crude oil for a period of time necessary to remove at least 50 wt. % of the mercury from the crude oil. Often, a mixing time of at least one minute is sufficient, after which the treated crude oil is separated from the mercury containing sulfide solution, though mixing times of at least 2 minutes, or at least 6 minutes, or at least 10 minutes, will often improve separation efficiencies.

After mixing the crude oil with the aqueous contacting solution, the mixture is separated to produce a treated oil containing a reduced concentration of mercury and a mercury containing sulfide solution. The mercury containing sulfide solution is further treated to reduce its pH by removing at least a portion of the ammonia and hydrogen sulfide contained in the sulfide solution as gases, while converting as least a portion of the mercury contained in the sulfide solution to particulate HgS in the resulting water stream. At least a portion of the gaseous ammonia and at least a portion of the gaseous hydrogen sulfide, generated during this further treating step are recycled to form the contacting solution. At least a portion of the water stream containing particulate HgS is further treated to form a concentrated HgS material and a purified water stream. In one embodiment, at least a portion of the purified water stream is recycled as the reaction water for the mercury removal process. Any dispersed or dissolved oil remaining in the purified water stream (or in any of the aqueous streams that are generated in carrying out the method), may be removed from the water by skimmers, decanters, API separators etc. This oil can be recycled to the start of the process.

Following extracting at least a portion of the non-volatile mercury from the crude oil into the aqueous contacting solution as soluble mercury sulfur complexes forming a mercury-containing sulfide solution, the mercury containing sulfide solution is separated, forming gaseous ammonia, gaseous hydrogen sulfide and a water stream containing particulate HgS. A separation step generally involves a stripping process, fractionation, using single or multistage distillation or flash separation. A stripping gas may be used to enhance the separation efficiency. Typical stripping gases include steam, nitrogen, carbon dioxide, air, methane, helium, argon, and the like. A gas is generally selected to be unreactive to the mercury compounds in the mercury containing sulfide solution at separation conditions. The separation is generally conducted at temperatures below which mercury sulfide in the solution would begin to decompose to form elemental mercury, e.g. at a temperature in a range from 20° C. to 200° C., or at a temperature in a range from 20° C. to 150° C., or at a temperature in a range of 20° C. to 100° C.

During separation by stripping, for example, at least a portion of the ammonium sulfide in the solution decomposes, forming gaseous ammonia and gaseous hydrogen sulfide. At least a portion of ammonium hydroxide that may remain in the ammonium sulfide solution also decomposes to gaseous ammonia. Evolution of gaseous ammonia and hydrogen sulfide from the solution is accompanied by a decrease in the pH of the solution. In one embodiment, the separation process for producing gaseous ammonia and gaseous hydrogen sulfide is maintained until the pH of the solution decreases to less than 9; or to less than 8 in one embodiment; or to less than 7.5 in one embodiment; or to less than 7 in one embodiment; or to a range from 7.5 to 5.5 in one embodiment. During evolution of gaseous ammonia, with the resulting decrease in pH, the mercury contained in the solution begins to precipitate as HgS. In one embodiment, gaseous ammonia and gaseous hydrogen sulfide are removed from the solution until greater than 50 wt.%, or in one embodiment greater than 60 wt. %, of the mercury contained in the solution is in the particulate form that can be removed by filtering through a 0.45 μm filter. During the separation, gaseous ammonia and gaseous hydrogen sulfide may be generated as a single mixed gaseous stream or as separate streams.

A water stream containing particulate HgS is also generated during separation of the mercury containing sulfide solution. In one embodiment, the water stream is a wastewater stream that is disposed using, for example, injection into a geological formation. In another embodiment, the water stream is further separated into a purified water stream and a concentrated HgS material. Concentrating the HgS may include one or more of filtration, centrifugation, adsorption of the HgS onto a solid matrix, or distillation. In one embodiment, the purified water stream contains less than 100 ppb mercury. It is desirable that at least 70 wt. %, and up to 100 wt. %, of the particulate HgS from the water stream is in the concentrated HgS material. The concentrated HgS material may be processed to further concentrate and recover mercury, or it may be disposed.

At least a portion of the purified water stream may be recycled as the reaction water for preparing the aqueous contacting solution. In one embodiment, at least 75 vol. % of the purified water stream is recycled as the reaction water; in another embodiment, at least 90 vol. % of the purified water stream is recycled. While the reaction water may be composed exclusively of the purified water stream, it will often be a mixture of the purified water stream and an amount of make-up water required to meet requirements of the method. In one embodiment, the reaction water comprises in a range from 10 vol. % to 100 vol. % purified water; in another embodiment, in a range from 25 vol. % to 100 vol. % purified water.

In one embodiment, the particulate HgS containing water stream is filtered, the filtered water being recycled to the contacting solution, and a concentrated particulate HgS material disposed. In one embodiment, the concentrated particulate HgS material is injected into an underground formation. In one embodiment, the concentrated particulate HgS material is treated in a biological oxidation process to produce a mercury-containing sludge. In one embodiment, the concentrated particulate HgS material is encapsulated with a material selected from the group consisting of concrete, cement, sulfur-concrete, plastics (e.g. Bakelite) and combinations thereof to form a solid. The solid may further be retorted to produce elemental mercury, or disposed in a landfill.

The contact with the contacting solution for mercury removal is for any period of time of: at least thirty seconds, at least 15 minutes; at least 30 minutes; at least 1 hr.; at least 2 hrs.; at least 4 hours; and at least 12 hours, forming an emulsion which subsequently separates into two phases, a water phase with mercury rich sulfide solution, and an oil phase with reduced mercury concentration. After the conversion of the non-volatile mercury to the water-soluble form, at least 50% of the non-volatile mercury originally in the crude oil is extracted into the water phase in one embodiment; at least 75% removal in a second embodiment; at least 80% removal in a third embodiment; at least 90% in a fourth embodiment; and at least 95% in a fifth embodiment. The treated crude oil contains less than 100 ppbw in non-volatile (particulate) mercury in one embodiment, less than 50 ppbw particulate mercury in another embodiment; and less than 10 ppbw in a third embodiment.

The contact between the crude oil and the contacting solution can be either via a non-dispersive or dispersive method. The dispersive contacting method can be via mixing valves, static mixers or mixing tanks or vessels, injection quills, orifice mixers or other methods known in the art. The non-dispersive method can be any of packed inert particle beds, fiber film contactors, or other method known in the art. The separation of treated crude oil from the aqueous phase can be carried out by methods known in the art, e.g., gravity settling, coalescing and the like.

In one embodiment, the removal of mercury is carried out in an integrated unit, e.g., a single vessel having a contact zone for crude oil containing heavy metals to be in intimate contact with the contacting solution, and a settling zone for the separation of the treated crude oil (with volatile mercury) from water phase. The contacting solution can be mixed with the crude oil prior to entering the contact zone, or injected as a separate stream into the contacting zone. The flow of the contacting solution and the crude oil in the unit can be counter-current or concurrent. In yet another embodiment, the mercury removal is conducted in a single tower with a top section for the mixing of the crude oil with the contacting solution and a bottom section for the separation of the treated crude oil from the water phase containing the removed mercury. In one embodiment, the top section comprises at least a contactor characterized by large surface areas, e.g., a plurality of fibers or bundles of fibers, allowing mass transfer in a non-dispersive manner.

In one embodiment, the equipment contains at least two contactors comprising fibers in series. The fibers in each contactor are wetted by the contacting solution to form a thin film on the surface of fibers, and present a large surface area to the crude oil to be in contact with the same or different contacting solution (e.g., sulfur-containing reagent). In one embodiment, the admixture of the treated crude oil and the contacting solution exits the bottom of the first contactor and flows into the next contactor in series, wherein additional contacting solution is introduced. The admixture exits the bottom contactor and is directed to a bottom separation section. In one embodiment, the bottom section also comprises fibers to aid with the separation, wherein the mixture of treated crude oil and the aqueous phase flows through the fibers to form two distinct liquid layers, an upper layer of treated crude oil with reduced mercury content and a lower aqueous phase layer containing dissolved mercury species. Further details regarding the description of exemplary treatment units are described in US Patent Publication Nos. US20100200477, US20100320124, US20110163008, US20100122950, and US20110142747; and U.S. Pat. Nos. 7,326,333 and 7,381,309, and the relevant disclosures are included herein by reference.

In one embodiment, the concentrated HgS material containing extracted mercury after separation can be disposed as wastewater by pumping it underground into a crude oil or oil reservoir (in production or depleted). In one embodiment, the wastewater after separation is treated prior to disposal, e.g., including the removal of any suspended oil and solids prior to injection. The oil/water separation and water treatment can be carried out using processes and equipment known in the art, including separators, hydroclone, mesh coalescer, filter, membrane, centrifuge and the like for the oil/water separation; ion exchange, electrodialysis, electrodialysis reversal, electrochemical, deionization, evaporation, electro-deionization, reverse osmosis, membrane separation, oxidation reactor, filtration, and combinations thereof.

In one embodiment, the mercury containing sulfide solution is regenerated by stripping to liberate gaseous ammonia and gaseous hydrogen sulfide for recycle and a particulate HgS containing water stream. Examples of a stripping gas include but are not limited to air, $N_2$, $CO_2$, $H_2$, methane, argon, helium, steam, air, natural gas, and combinations thereof. The stripping gas is inert with respect to adverse reactions with the crude oil, the sulfide solution, or components thereof. In one embodiment, the stripping gas is a gas that originally contained mercury, such as the natural gas removed from the crude oil before treatment with the aqueous sulfur-containing solution, but from which the mercury has been removed by an Hg adsorbent. In this fashion, a gas can be recycled between the mercury-rich sulfide solution and an Hg adsorbent, with mercury in the aqueous phase being transferred to the adsorbent.

The particulate HgS containing water stream may be disposed as prepared, such as, for example, injection into a subterranean formation. The water stream may be further concentrated by, for example, filtering or evaporation to give a small amount of a mercury containing waste.

The particulate HgS containing water stream may be filtered such that at least 50%, or at least 75%, or at least 90% of the HgS particulates having an effective particulate size with regard to filtering of greater than 2 microns, or in the alternative having an effective particulate size of greater than 1 μm, are removed in a concentrated particulate HgS stream. The concentrated particulate HgS stream contains at least 50 wt. % of the mercury contained in the crude oil feed to the process. Particulate HgS makes up at least 5 wt. % of the concentrated particulate HgS stream.

In an embodiment, the particulate HgS containing water stream is passed to a filtering zone for separating a concentrated particulate HgS stream from a filtered water stream. In one embodiment, the mercury content of the filtered water stream is 10 ppm or less; in another embodiment, 1000 ppb or less; in another embodiment, 100 ppb or less; in another embodiment, 10 ppb or less. At least some of the filtered water stream may be passed as recycle to the contacting zone. When removed from the process, the filtered water stream may be reused in other applications or disposed.

The concentrated particulate HgS stream may be disposed, for example, by injection into a formation, retorted to recover elemental mercury, by encapsulation, or by mixing with cement/concrete to form a non-leachable mass. The mercury removal methods and equipment described herein may be placed in the same location of a production facility, i.e., geological hydrocarbon producing well, or placed as close as possible to the location of the well. In one embodiment, the contacting solution is introduced to the oil-water mixture at the well head, for the simultaneous reaction to remove mercury from the crude oil to occur in the pipeline as the material flows to an oil processing facility located at a different location further away. The natural mixing in the pipeline can be augmented with the use of mixers at the point of introduction of the contacting solution, or at intervals downstream in the pipeline. Examples include static or in-line mixers. In another embodiment, the contacting solution is introduced to the oil-water mixture in the well itself underground.

In another embodiment, the method is employed to remove predominantly non-volatile mercury from crude oil during refinery processing steps that precede distillation. This reduces or eliminates mercury contamination in distilled products. In yet another embodiment, the mercury removal equipment is placed at an offshore facility for the production of oil and/or natural gas, such as but not limited to a floating production, storage and offloading (FPSO) unit. A FPSO is a floating vessel for the processing of hydrocarbons and for storage of oil. The FPSO unit processes an incoming stream of crude oil, water, gas, and sediment, and produces a shippable crude oil with acceptable properties including levels of heavy metals such as mercury, vapor pressure, basic sediment & water (BS&W) values, etc.

Reference is now made to the drawings, which illustrate embodiments of the method.

Figure 1:
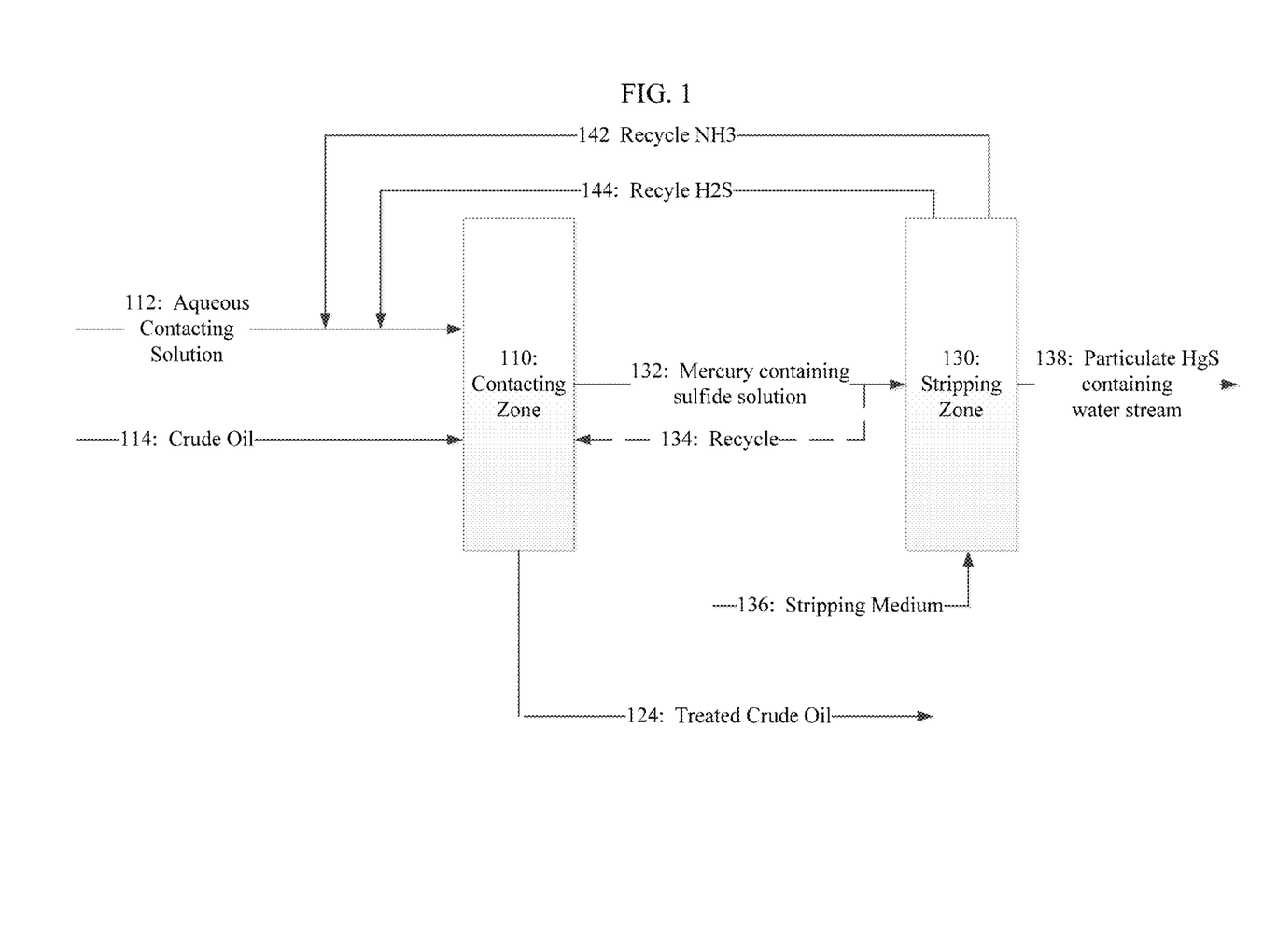
FIG. 1 and FIG. 2 illustrate embodiments of the method for removing a trace amount of mercury from a crude oil feed.

In the embodiment illustrated in FIG. 1, an aqueous contacting solution 112 and crude oil 114 are mixed, either before or within a contacting zone 110. Illustrative conditions within the contacting zone include a pressure of 2500 psig and a temperature of 90° C. for upstream near wellbore operations, and a pressure of 150 psig and a temperature of 200° C. for downstream refinery operations. In the contacting zone 110, non-volatile mercury in the crude is extracted into the aqueous contacting solution, forming a mercury containing sulfide solution 132, which contains soluble mercury sulfur complexes. Treated crude oil 124 is separated from the mercury containing sulfide solution 132 and passed to other processing. A portion of the mercury containing sulfide solution 132 may be recycled 134 to the contacting zone 110. In the embodiment of FIG. 1, the mercury containing sulfide solution 132 is contacted with a steam stripping medium 136 within stripping zone 130, from which an $NH_3$ stream 142 and an $H_2S$ stream 144 are recovered and recycled to the aqueous contacting solution 112. A particulate HgS containing water stream 138 is also recovered from the stripping zone 130.

Figure 2:
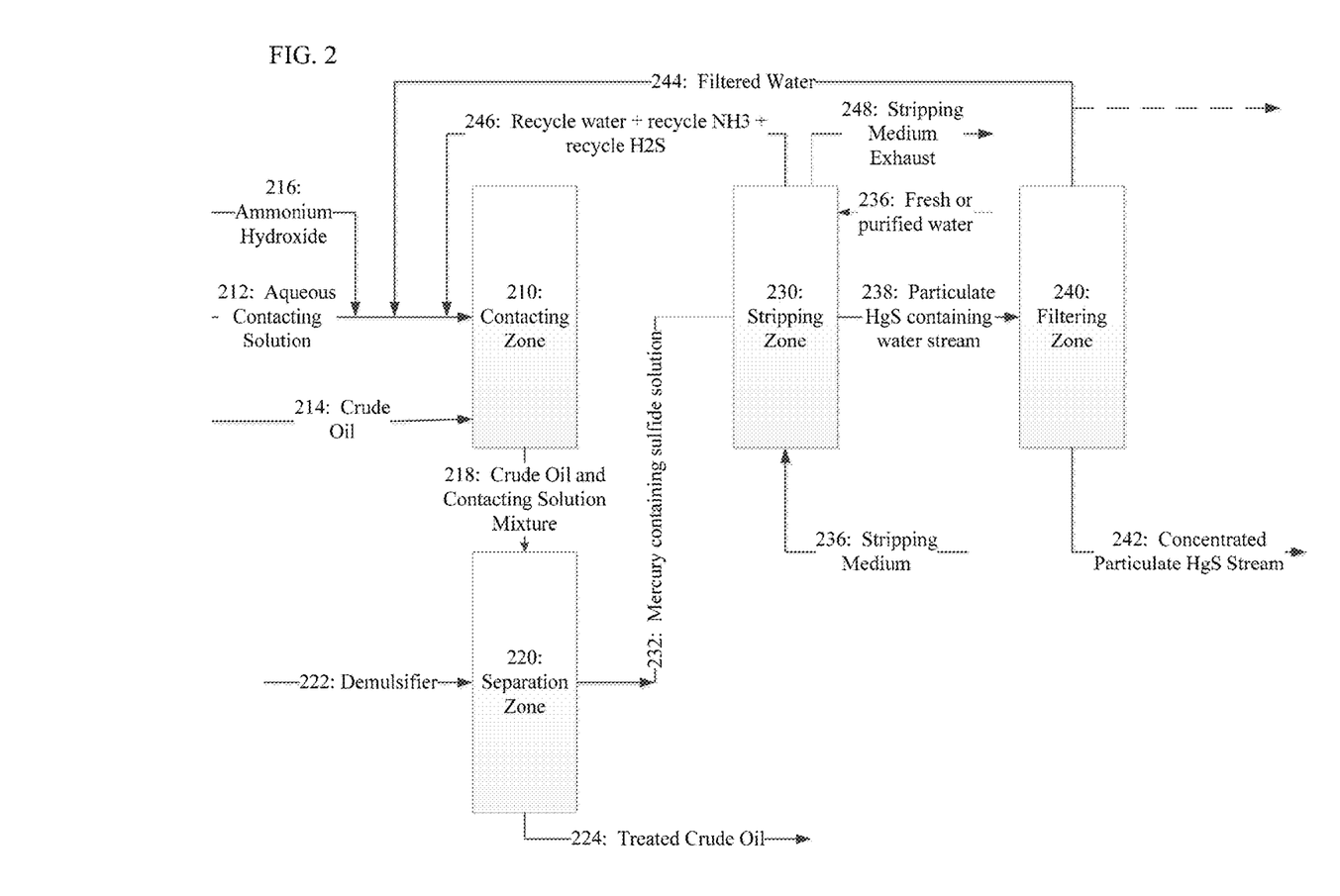

In the embodiment illustrated in FIG. 2, an aqueous contacting solution 212 and crude oil 214 are mixed either before or within a contacting zone 210. The aqueous contacting solution may contain ammonium hydroxide. Alternatively, ammonium hydroxide may be added as a separate feedstream 216. The contacting solution 212 may include filtered water 244 from filtering zone 240 and further may include a mixture 246 of recycle water, recycle $NH_3$ and recycle $H_2S$ from a stripping zone 230. While the recycle water, recycle $NH_3$ and recycle $H_2S$ are shown as being passed to the aqueous contacting solution as a single stream, they may be supplied as more than one separate stream. In the contacting zone 210, non-volatile mercury in the crude is extracted into the aqueous contacting solution, forming a mercury containing sulfide solution 232 containing soluble mercury sulfur complexes. A mercury containing sulfide solution may be separated from a treated crude oil in the contacting zone 210. Alternatively, as shown, a crude oil and contacting solution mixture 218 from the contacting zone 210 is passed to separation zone 220; from which is produced treated crude oil 224 and the mercury containing sulfide solution 232. Separation zone 220 may be operated as a liquid-liquid two phase separation zone. Such separation may be facilitated with the addition of one or more demulsifiers 222 to the crude oil and contacting solution mixture 218, or to the separation zone 220. The pressure and temperature with the separation zone generally matches those of the contacting zone, taking account of insignificant heat and pressure loss that are normally encountered in such processing.

A mercury containing sulfide solution 232 is passed to stripping zone 230 for removing $NH_3$ and $H_2S$ from the solution and for increasing the amount of particulate mercury in a resulting particulate HgS containing water stream 238. A stripping medium 236 passed to the stripping zone 230 may be used to facilitate separation of the $NH_3$ and $H_2S$ from the sulfide solution. The stripping medium 236 is generally a gas that is inert with regard to the materials within stripping zone 230. Examples of a useful stripping medium include nitrogen, carbon dioxide, air, methane, helium, argon, and the like. A stripping gas is generally selected to be unreactive to the mercury compounds in the mercury containing sulfide solution at separation conditions. The stripping medium 236 removes $NH_3$ and $H_2S$ from the mercury containing sulfide solution, as well as generating vapor phase water. Facilities may be provided, optionally within the stripping zone as an overhead condenser, for condensing the water vapor generated during stripping and absorbing the $NH_3$ and $H_2S$ which are generated within the stripping zone to form recycle stream 246. In one embodiment, additional purified or fresh water 236 may be added to the overhead condenser of the stripping zone 230. When the ammonia and $H_2S$ generated in the stripping zone 230 are combined with water produced in the stripping process, the exhaust stripping medium exits the stripping zone 230 through 248.

The particulate HgS containing water stream from the stripping zone 230 is passed to filtering zone 240 for separating a concentrated particulate HgS stream 242 and a filtered water stream 244. At least some of the filtered water stream 244 may be recycled for use in the aqueous contacting solution 212. In one embodiment, the mercury content of the filtered water stream is 10 ppm or less; in another embodiment, 1000 ppb or less; in another embodiment, 100 ppb or less; in another embodiment, 10 ppb or less.

EXAMPLES

Examples 1-2 (Dissolution of HgS and Hg(0) in Ammonium Sulfide Solutions)

To understand how HgS and Hg(0) dissolve in ammonium sulfide solutions the following room temperature experiments were performed.

Approximately $\frac{1}{10}^{th}$ gram of metacinnabar powder (HgS from Alfa Aesar) or liquid elemental mercury (Fisher Scientific) was placed in 40 ml VOA vials. Then 20 ml of 10% solutions of ammonium sulfide (Sigma Aldrich) was added. The mixtures were shaken by hand for 30 seconds and then mixed for two minutes on a Vortex™ mixer. The solutions were allowed to stand undisturbed for fifteen minutes. Then the mercury content of the supernatant was measured by Lumex™. The results are summarized in Table 1.

TABLE 1

| Example No | Hg Source | Actual Amount, g | pH | Observed Hg, ppm | Percent Dissolved |
|---|---|---|---|---|---|
| 1 | HgS | 0.11 | 10.28 | 79 | 1.71 |
| 2 | Hg(0) | 0.11 | 10.28 | 72 | 1.63 |

These results show that solutions containing up to about 4500 ppm of mercury can be prepared by dissolving either elemental mercury or mercuric sulfide in various sulfidic solutions. All the mercury can be dissolved if sufficient solution is used.

Examples 3-14 (Impact of Additional NH$_4$OH on Ammonium Sulfide Dissolution of HgS)

In Examples 3-14, a solution of ammonium sulfide was used to dissolve HgS from the crude oil. Varying amounts of excess ammonia (i.e. ammonium hydroxide) were correlated with the HgS removal effectiveness. Data from tests using excess ammonia were compared with data for stoichiometric ammonium sulfide (NH$_4$/S=2.00).

Approximately 1/10$^{th}$ gram of metacinnabar powder (HgS from Alfa Aesar) was placed in 40 ml VOA vials. Then 20 ml of various solutions of ammonium sulfide (Sigma Aldrich) and ammonium hydroxide (Sigma Aldrich) were added. The samples were spun on a rotating wheel for 3 hours and then allowed to settle for one hour. The supernatants were filtered through a 0.45 micron filter and analyzed by Lumex™. The results are summarized in Table 2.

TABLE 2

| Example No | (NH$_4$)OH Conc | Ammonium Sulfide Conc. | NH$_4$/S Molar Ratio | Hg (ppm) in Ammonium Sulfide Soln | pH |
|---|---|---|---|---|---|
| 3 | 0% | 3% | 2.00 | 8 | 9.84 |
| 4 | 1.68% | 3% | 3.30 | 22 | 10.38 |
| 5 | 5.84% | 3% | 5.89 | 51 | 10.89 |
| 6 | 9.74% | 3% | 8.48 | 72 | 11.09 |
| 7 | 13.63% | 3% | 11.07 | 83 | 11.34 |
| 8 | 17.53% | 3% | 13.66 | 93 | 11.51 |
| 9 | 0% | 1% | 2.00 | 2 | 9.85 |
| 10 | 1.68% | 1% | 5.89 | 11 | 10.72 |
| 11 | 5.84% | 1% | 13.66 | 28 | 11.27 |
| 12 | 9.74% | 1% | 21.43 | 41 | 11.51 |
| 13 | 13.63% | 1% | 29.20 | 45 | 11.75 |
| 14 | 17.53% | 1% | 36.97 | 48 | 11.96 |

The mercury concentration in the aqueous solution increased with both increasing ammonium sulfide and ammonium hydroxide concentrations.

As shown in Table 2, a NH$_4$/S molar ratio of greater than 2 is increasingly effective for HgS removal, with a NH$_4$/S molar ratio of at least 3, or a NH$_4$/S molar ratio of at least 6, or a NH$_4$/S molar ratio of at least 10 being particularly effective.

Example 15 (Preparation of Mercury-containing Water Phase Using Ammonium Sulfide)

Metacinnabar was dissolved in a nominal 1 wt. % solution of ammonium sulfide in deionized water to give 6,387 ppbw mercury. This was used in various studies of precipitation of HgS.

Example 16 (Removal of Dissolved Mercury From Ammonium Sulfide Solution by Stripping)

The solution from Example 15 was used to study HgS precipitation during the stripping of ammonium sulfide from the aqueous solutions.

Three hundred grams of the solution was placed in a three neck flask equipped with a stir bar, nitrogen purge of 300 cc/min, a heating mantle, a reflux condenser equipped with tap water cooling, and a sampling port. Initially, this mercury could not be removed by a 1 micron filter. The solution was heated to 95° C. The ammonium sulfide was stripped out by the nitrogen purge. Samples were withdrawn and analyzed for mercury by a Lumex™ analyzer. A portion of the sample was filtered through a 1 micron filter to determine the amount of particulate Hg in the sample. Results are summarized in Table 3.

TABLE 3

| Time, min | 0 | 0 | 5 | 15 | 30 | 45 | 60 | 120 | 180 | 210 | 240 |
|---|---|---|---|---|---|---|---|---|---|---|---|
| pH | 9.57 | 9.23 | 9.11 | 9.01 | 8.95 | 8.81 | 8.8 | 8.32 | 7.68 | 7.34 | 6.9 |
| Temp. | 25 | 95 | 95 | 95 | 95 | 95 | 95 | 95 | 95 | 95 | 95 |
| Hg in Aqueous, ppbw | 6,387 | 6,517 | 6,783 | 6,607 | 6,823 | 6,593 | 6,550 | 6,400 | 2,937 | 2,180 | 1,950 |
| Hg after Filter, ppbw | 6,310 | 6,543 | 6,680 | 6,560 | 6,730 | 6,607 | 6,623 | 6,387 | 880 | 104 | 14 |
| % Hg in Aqueous | 100 | 75 | 78 | 76 | 78 | 76 | 75 | 73 | 34 | 25 | 22 |
| % Hg filterable | 1 | 0 | 2 | 1 | 1 | 0 | −1 | 0 | 70 | 95 | 99 |
| % Hg Recovery | 100 | 75 | 78 | 76 | 78 | 76 | 75 | 73 | 34 | 25 | 22 |
| % Hg Loss | 0 | 25 | 22 | 24 | 22 | 24 | 25 | 27 | 66 | 75 | 78 |

As the ammonium sulfide was stripped from the mercury-containing aqueous sulfidic solution the pH drops to below about 7.5 and the mercury can be removed by filtration.

Example 17 (Removal of Dissolved Mercury from Ammonium Sulfide Solution by Stripping)

The final product from experiment 16 was passed through a series of filters and analyzed. The results are in Table 4.

TABLE 4

| filter | ppbw | % Removed |
|---|---|---|
| None | 2,250 | 0 |
| 20 μm | 829 | 63 |
| 5 μm | 800 | 64 |
| 1 μm | 144 | 94 |

A one micron filter will remove the precipitated HgS. Also, black precipitate of HgS was observed when samples were allowed to stand. Thus filtration, settling and combinations can be used to recover the precipitated HgS.

Examples 18

The following examples were used to study the extraction of mercury from various crude oils and condensates with mixtures of ammonium sulfide and ammonium hydroxide. Twelve different oils were studied.

TABLE 5

| Feed | Description | Avg Hg content, ppb |
|---|---|---|
| 1 | condensate | 284 |
| 2 | crude oil | 707 |
| 3 | crude oil | 7704 |
| 4 | condensate | 2644 |
| 5 | condensate | 1182 |
| 6 | condensate | 2064 |
| 7 | condensate | 3737 |
| 8 | condensate | 1147 |
| 9 | condensate | 1661 |
| 10 | crude oil | 1677 |
| 11 | crude oil | 321 |
| 12 | crude oil | 423 |

Solutions of ammonium sulfide and ammonium hydroxide were prepared. These solutions and the feeds were pre-heated in an oven to the indicated temperature. For samples fluid at room temperature, the temperature of the oven was 40° C. Waxy samples required heating to higher temperatures. Then small volumes of the sulfide solution and crude oil were added to 2 ml mini-centrifuge tubes. The ratio of aqueous volume to crude oil volume was varied. These samples were kept in the oven at the indicated temperature. Then they were mixed on a Vortex™ mixer for the indicated times. For six and ten minute mixing, the samples were mixed for two minutes, put back in the oven to reheat for 15 minutes, and then repeated for a total of six or ten minutes. The samples were then reheated for 15 minutes and then centrifuged in a mini-centrifuge for two minutes. The samples were then placed back in the oven to allow any emulsions to separate. The upper hydrocarbon and lower aqueous phases were sampled and analyzed for mercury by Lumex™.

Example 19

Results from the tests of Example 18 were found to show that by using as little as 0.5% ammonium sulfide with no ammonium hydroxide, the mercury content of the crude oils could be reduced consistently below 35%. The average percent Hg remaining in the feeds of Example 18 as a function of ammonium sulfide and no ammonium hydroxide and using 2 minute mixing and 1:1 volume of feed hydrocarbon aqueous solution is shown in Table 6.

TABLE 6

| Average Percent Hg remaining in Crude oils vs. Ammonium Sulfide Concentration | | |
|---|---|---|
| 0.5% Ammonium Sulfide | 1.0% Ammonium Sulfide | 3.0% Ammonium Sulfide |
| 14.9 | 12.6 | 8.8 |

Example 20

Increasing the ratio of crude oil to aqueous phase decreased the removal from the feeds (crude oil or condensate) listed in Table 5. But good removal could be achieved even when the ratio of feed to aqueous was 5:1. The average percent Hg remaining in crude oils as a function of volume ratio of crude oil to aqueous phase using 1 wt. % ammonium sulfide and no ammonium hydroxide concentrations and using 2 minute mixing is shown in Table 7.

TABLE 7

| Average Percent Hg remaining in Crude oils vs. Volume Ratio of Crude oil to Aqueous Phases | | |
|---|---|---|
| 1:1 Crude oil/Aqueous | 2:1 Crude oil/Aqueous | 5:1 Crude oil/Aqueous |
| 8.8 | 9.2 | 12.5 |

Example 21

Longer mixing times improved the Hg removal, but good removal was obtained with mixing times as short as two minutes. The average percent Hg remaining in feeds of Table 5 as a function of mixing time using 1 wt. % ammonium sulfide and no ammonium hydroxide concentrations and 1:1 volume ratio of crude oil to aqueous phases is shown in Table 8.

TABLE 8

| Average Percent Hg remaining in Crude oils vs. Mixing Time | | |
|---|---|---|
| 2 Minutes | 6 Minutes | 10 Minutes |
| 18.7 | 15.4 | 13.0 |

Example 22

The impact of extra ammonium hydroxide on three feeds at 1 wt. % ammonium sulfide, 2 minutes mixing time, 1:1 volume ratio of crude oil to aqueous phases is shown in Table 9.

TABLE 9

Percent Hg remaining in Crude oils vs. Ammonium Hydroxide Addition

| Feed | 0% Added NH$_4$OH NH$_4$/S = 2.00 | 1% Added NH$_4$OH NH$_4$/S = 3.95 | 5% Added NH$_4$OH NH$_4$/S = 11.71 | 10% Added NH$_4$OH NH$_4$/S = 21.43 |
|---|---|---|---|---|
| 3 | 4.3 | 2.2 | 2.2 | 0.9 |
| 4 | 3.4 | 0.9 | 1.1 | 0.6 |
| 7 | 13.3 | 4.8 | 4.2 | 3.2 |

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the" include plural references unless expressly and unequivocally limited to one referent.

As used herein, the term "include" and its grammatical variants are intended to be non-limiting, such that recitation of items in a list is not to the exclusion of other like items that can be substituted or added to the listed items. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms, including technical and scientific terms used in the description, have the same meaning as commonly understood by one of ordinary skill in the art to which this invention belongs.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are ex

What is claimed is:

1. A method for removing a trace amount of mercury from a crude oil feed, comprising:
    a. providing a crude oil having a concentration of mercury in which at least 50% of the mercury is non-volatile mercury;
    b. mixing the crude oil with an aqueous contacting solution at crude oil/contacting solution volumetric ratio in a range from 0.1:1 to 20:1, forming a mixture, wherein the aqueous contacting solution contains recycle NH$_3$ and recycle H$_2$S;
    c. extracting at least a portion of the non-volatile mercury from the crude oil into the aqueous contacting solution as soluble mercury sulfur complexes forming a mercury containing sulfide solution;
    d. separating the mercury containing sulfide solution from the crude oil for a treated crude oil having a reduced concentration of non-volatile mercury;
    e. stripping the mercury containing sulfide solution for a time sufficient to reduce the pH of the solution to less than 7.5, and recovering NH$_3$, H$_2$S, and a particulate HgS containing water stream; and
    f. recycling at least a portion of the NH$_3$ as the recycle NH$_3$ to the aqueous contacting solution and recycling at least a portion of the H$_2$S as the recycle H$_2$S to the aqueous contacting solution for mixing with the crude oil.

2. The method of claim 1, wherein the aqueous contacting solution has a concentration of ammonium sulfide in the aqueous contacting solution of 1 wt. % or greater.

3. The method of claim 1, wherein the aqueous contacting solution contains NH$_3$ and H$_2$S in a NH$_4$/S molar ratio of equal to or greater than 1:1.

4. The method of claim 1, wherein the aqueous contacting solution contains NH$_3$ and H$_2$S in a NH$_4$/S molar ratio between 1:1 and 2:1, inclusive of end members.

5. The method of claim 1, wherein the aqueous contacting solution contains NH$_3$ and H$_2$S in a NH$_4$/S molar ratio of at least 3.

6. The method of claim 1, wherein the aqueous contacting solution further comprises ammonium hydroxide.

7. The method of claim 1, wherein the aqueous contacting solution has a pH of at least 9.

8. The method of claim 1, wherein the aqueous contacting solution is mixed into the crude oil providing a molar ratio of greater than 50:1 of sulfur in the aqueous ammonium sulfide solution to mercury in the crude oil.

9. The method of claim 1, further comprising stripping the mercury containing sulfide solution for a time sufficient to convert at least 50 wt. % of the mercury in the sulfide solution to particulate HgS.

10. The method of claim 1, wherein stripping the mercury containing sulfide solution is conducted at a temperature below which mercury sulfide in the solution decomposes to form elemental mercury.

11. The method of claim 1, wherein stripping is conducted at a temperature in a range from 20° C. to 200° C.

12. The method of claim 1, further comprising filtering the particulate HgS containing water stream to remove at least 50 wt. % of the mercury contained therein, to form a filtered water stream.

13. The method of claim 12, further comprising recycling at least a portion of the filtered water stream to the aqueous contacting solution for mixing with the crude oil.

14. The method of claim 13, wherein the filtered water stream contains less than 100 ppb mercury.

15. The method of claim 12, further comprising filtering the particulate HgS containing water stream and recovering a concentrated particulate HgS material that contains at least 70 wt. % of the particulate mercury contained in the particulate HgS containing water stream.

16. The method of claim 15, wherein the concentrated particulate HgS material is injected into an underground formation.

17. The method of claim 15, wherein the concentrated particulate HgS material is treated in a biological oxidation process to produce a mercury-containing sludge.

18. The method of claim 15, wherein concentrated particulate HgS material is retorted to produce elemental mercury.

19. The method of claim 15, wherein the concentrated particulate HgS material is encapsulated with a material selected from the group consisting of concrete, cement, sulfur-concrete, plastic and combinations thereof to form a solid.

20. The method of claim 19, wherein the solid is disposed in a landfill.

21. The method of claim 1, further comprising:
   a. recovering a vapor phase water stream, the $NH_3$ and the $H_2S$ from the step of stripping the mercury containing sulfide solution; and
   b. condensing the vapor phase water stream in the presence of the $NH_3$ and the $H_2S$ to form a combined stream comprising the recycle $NH_3$ and the recycle $H_2S$ for recycling to the aqueous contacting solution.

22. The method of claim 1, wherein the treated crude oil contains less than 100 ppbw of mercury.

23. The method of claim 1, wherein the treated crude oil contains less than 100 ppbw of non-volatile mercury.

24. The method of claim 1, wherein the mixing is conducted for a period of time of at least 1 minute.

25. The method of claim 1, further comprising:
   a. stripping the treated crude oil;
   b. generating a second $NH_3$ and recycling at least a portion of the second $NH_3$ to the aqueous contacting solution for mixing with the crude oil; and
   c. generating a second $H_2S$ and recycling at least a portion of the second $H_2S$ to the aqueous contacting solution for mixing with the crude oil.

26. The method of claim 25, wherein at least a portion of the second $NH_3$ and at least a portion of the second $H_2S$ are absorbed in water prior to being recycled to the aqueous contacting solution.

\* \* \* \* \*